United States Patent

Thevenaz

[15] 3,680,811
[45] Aug. 1, 1972

[54] KINEMATOGRAPHIC APPARATUS
[72] Inventor: Jean Thevenaz, Grandson, Switzerland
[73] Assignee: Paillard S.A., Sainte-Croix, Vaud, Switzerland
[22] Filed: March 10, 1970
[21] Appl. No.: 18,201

[30] Foreign Application Priority Data
March 24, 1969 Switzerland..............4364/69
March 24, 1969 Switzerland..............4365/69

[52] U.S. Cl....................................242/189, 242/205
[51] Int. Cl. .....B65h 59/38, G03b 1/04, G11h 15/32
[58] Field of Search...242/189, 190, 182, 183, 207–210, 242/75.5, 75.51; 200/61.18; 352/159, 166, 174, 176

[56] References Cited

UNITED STATES PATENTS

| | | | |
|---|---|---|---|
| 1,944,037 | 1/1934 | Proctor | 352/176 |
| 3,175,777 | 3/1965 | Jones, Jr. | 242/190 |
| 3,448,668 | 6/1969 | Nomura et al. | 352/174 X |
| 1,153,887 | 9/1915 | Blair | 242/189 |
| 3,181,805 | 5/1965 | Keznickl et al. | 242/190 X |

Primary Examiner—Leonard D. Christian
Attorney—Emory L. Groff and Emory L. Groff, Jr.

[57] ABSTRACT

A system for uniformizing the speed at which a kinematographic film is wound round the take-up spool in a view-taking or projecting apparatus by means of a feeler engaging a loop formed by the film between the exposure gate and said spool. When ever the speed of winding excessively tensions the film passing out of the gate, the loop shrinks and the stops the spool either by opening a switch in the circuit feeding a driving motor or by mechanically acting on a roller or gear driving the spool For reversed progression a second roller or gear can be used which is similarly controlled by the feeler.

6 Claims, 3 Drawing Figures

KINEMATOGRAPHIC APPARATUS

Kinematographic view-taking and projecting apparatus include a film take-up spool adapted to be engaged by the film leaving the guiding channel. Said spool is generally driven by means of a friction coupling, the input gear of which revolves at a speed which is always higher than the highest angular speed required for the take-up spool. This results in a loss of power which cannot be neglected in such a coupling since its output gear revolves at an angular speed defined by the linear speed of progression of the film.

Furthermore, the torque transmitted to the spool by the coupling is substantially constant and consequently the tensioning of the film decreases as the diameter of its winding increases. The tensioning of the film when wound varies thus and this affects detrimentally the uniformity of the winding.

The present invention has for its object to reduce the power required for driving the take-up spool, while improving the uniformity of winding.

More specifically, the invention covers a kinematographic apparatus including a film-guiding channel, means driving the film through the channel and a take-up spool, the novelty of the invention including means for driving said spool in a pulsatory intermittent manner.

The accompanying drawing illustrates diagrammatically and by way of example three embodiments of the present invention. In said drawing.

Figure 1:
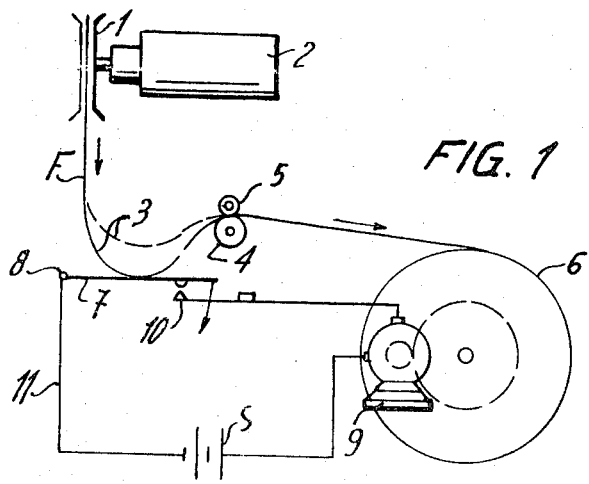
FIG. 1 illustrates means driving the take-up spool by means of pulses in accordance with the first embodiment of the invention.

In the arrangement illustrated in FIG. 1, the film F as it passes out of the film guiding exposure channel or gate 1 facing the objective 2 of the apparatus describes a loop 3 of a variable length after which it passes between two guiding rollers 4 and 5 and is wound round a take-up spool 6.

An electric circuit 11 fed by a supply S includes a switch controlled by a feeler 7 constituted by a thin and yielding metal blade secured through its end 8 and an electric motor 9 adapted to drive through a pinion and a toothed wheel the take-up spool 6.

The drive of said take-up spool is as follows:

When the loop 3 of the film F fed by the exposure channel reaches a predetermined length, it engages the yielding feeler 7 which, under the thrust exerted by the film, is lowered and moves in the direction of the arrow so as to rest through its free terminal section on the contact-piece 10 forming with the feeler the switch closing the electric circuit 11. The motor 9 then starts and drives the take-up spool 6. As the latter stores more and more film material, the loop 3 becomes shorter and the switch opens and deenergizes the circuit 11 since the loop no longer exerts any pressure on the feeler 7 which returns into its original horizontal position. Consequently, the motor 9 stops until a further increase in length of the loop formed by the film again produces a closing of the circuit, this procedure continuing intermittently in the manner disclosed.

The oscillatory period of the arrangement depends on the mechanical and electric data governing the different parts. It is possible to act on said data so as to provide, for instance, once a normal rhythm of operation is reached, for the closing and opening of the switch to be obtained at the frequency of the succession of the pictures by means of the alternating movements of the loop produced by the intermittent progression of the film. The difference between the linear speed of the film and the tangential speed of the spool is thus compensated by the more or less long periods of closing of the switch.

Figure 2:
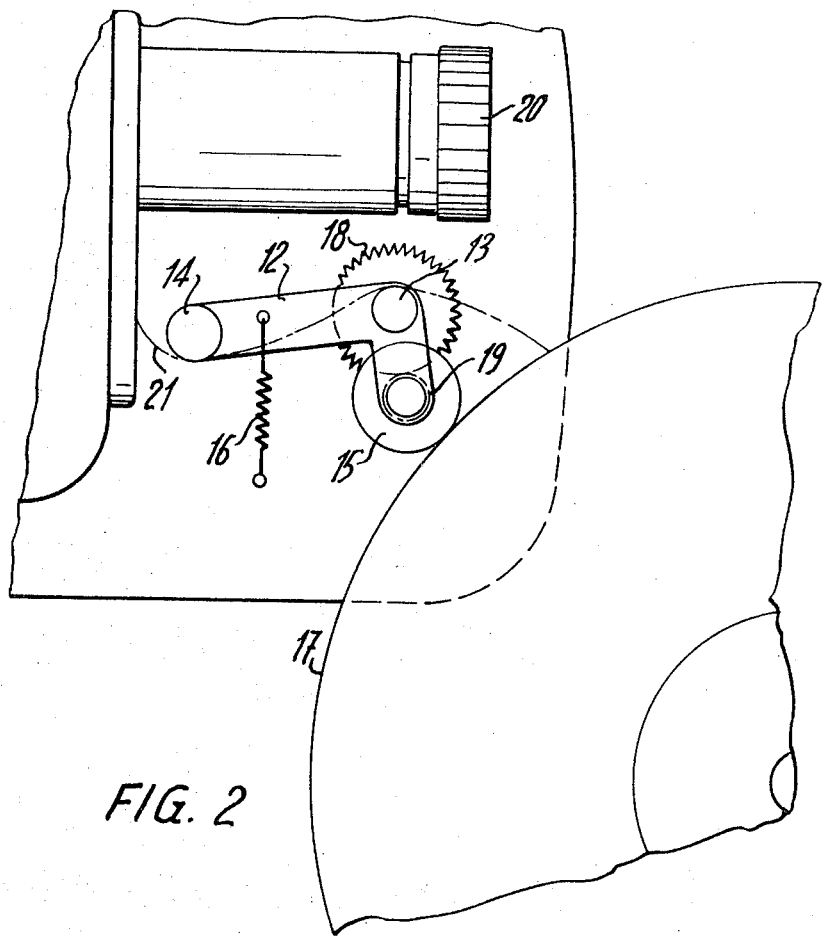
FIG. 2 is a view illustrating a second embodiment of an arrangement driving the take-up spool by means of pulses.

The driving arrangement illustrated in FIG. 2 includes a bell crank 12 pivotally secured to a shaft 13. Said bell crank 12 carries at one end a stud or projection 14 acting as a loop-contacting feeler while its other end carries a roller 15 acting as a driving gear. A spring 16 acts on the bell crank 12 so as to urge the roller 15 against the periphery of the flange of a spool 17. The roller 15 is driven by a toothed wheel 18 rigid with the shaft 13 driven in its turn by the motor of the kinematographic apparatus. Said wheel 18 meshes with a toothed pinion 19 coaxially rigid with the roller 15.

In order to obtain a satisfactory operation of the projector the film which has progressed behind the objective 20 should form a loop 21 before it is wound around the spool 17.

The rotary speed of the roller 15 is sufficient for it to drive the spool 17 at a speed which is slightly higher than that required for the winding of the film. Consequently, the loop 21 of the film shrinks during the winding around the spool until the film actually engages the stud 14 on the bell crank 12. The film causes then the bell crank 12 to rock against the action of the spring 16 so as to shift the roller 15 away from the spool 17, which latter is no longer driven by said roller and allows the loop to increase in size.

As soon as the loop 21 has become sufficiently large, the spring 16 returns the bell crank into its original position so that the roller 15 reengages the spool and drives it again. By reason of its inertia, the spool 17 does not stop suddenly when its drive is discontinued. Since the bell crank 12 moves speedily over a small angular distance, this produces a drive of the spool 17 by means of pulses providing a uniform average speed.

Figure 3:
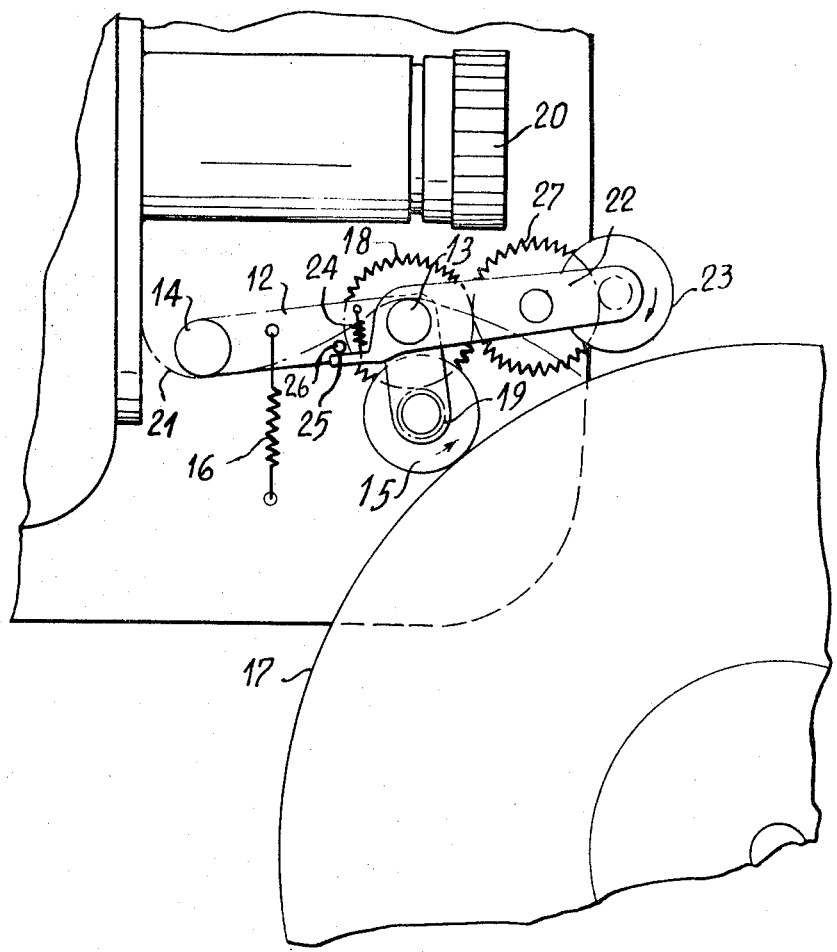
FIG. 3 illustrates the third embodiment.

The embodiment illustrated in FIG. 3 includes the same components as that illustrated in FIG. 2, together with further parts adapted to drive the spool 17 in a reversed direction. To this end, an oscillating arm 22 is pivotally secured independently of the bell crank 12 to the shaft 13. Said oscillating arm 22 carries at its free end a driving gear constituted by a roller 23 driven in a direction opposed to the rotation of the roller 15 by an intermediate toothed wheel 27 meshing with the toothed wheel 18 rigid with the shaft 13.

The bell crank 12 is operatively connected with the oscillating arm 22 by means of a spring 24 the ends of which are secured on the one hand to an arm of the bell crank 12 and on the other hand to a projection or stud 25 on the arm 22. Said spring 24 urges the stud 25 against a stop 26 secured to one side of the bell crank 12.

The arrangement illustrated in FIG. 3 is of particular interest in the case of kinematographic projectors since it affords means for reversal of the film without any reversal in the direction of rotation of the motor, as allowed by the shifting in time of the operation of the film driving claws.

In such projectors, the feed spool is driven by means similar to those driving the take-up spool. Both spool driving means are controlled synchronously by the motor controlling the film driving claws.

The operation of the arrangement illustrated in FIG. 3 is the same for forward motion as that of the arrangement illustrated in FIG. 2. For rearward operation providing a reversal of the progression of the film, the loop 21 shrinks, so that the film first engages the stud 14 so as to make the bell crank 12 rock against the action of the spring 16, which causes the reversing roller 23 to move towards the spool 17.

As the film continues its rearward progression, the loop 21 continues shrinking and the roller frictionally engages the spool 17 and drives it in the film unwinding direction.

The pivotal connection between the bell crank 12 and the arm 22 allows the bell crank 12 to continue rocking in spite of the arm 22 being arrested by reason of the contacting between the roller 23 and spool 17. As soon as the speed of unwinding rises above the speed of its reverse movement in the exposure gate in registry with the objective 20, the loop 21 expands so that the roller 23 again moves away from the spool 17.

According to an embodiment which is not illustrated, it is possible to provide a metal blade for elastically connecting the bell crank 12 with the stud 14. This would allow the roller 15 to transmit in the case illustrated in FIGS. 2 and 3 only the average value of the loop 21 of the film.

I claim:

1. In a film operating kinematographic camera, the combination of a film guiding exposure gate, a take-up spool, means driving the film through the gate, means driving the take-up spool to wind the film passing out of the gate around said take-up spool at a rhythm of operation equal to that of the gate, means for intermittently stopping the winding of the film to make the average speed of linear progression of the film on the spool match its linear progression through the gate, said film being adapted to form a loop between the gate and the take-up spool, said means driving the take-up spool including a roller engaging the take-up spool to ensure the winding of the film around the spool, said intermittent film stopping means including a feeler engaging said loop, a member interconnecting said feeler with said roller and adapted to urge said roller away from the take-up spool whenever said loop shrinks to a predetermined extent.

2. The combination as claimed in claim 1 wherein said means for driving the take-up spool includes a second roller frictionally engaging said take-up spool alternately with said first mentioned roller to operatively ensure respectively the winding and the unwinding of the film around the spool and the intermittent film stopping means include a feeler engaging said loop and adapted to urge the operative roller away from the take-up spool and said member interconnects said feeler with both of said rollers.

3. The combination as claimed in claim 1 wherein said means for driving the take-up spool includes a second roller frictionally engaging said take-up spool alternately with said first mentioned roller to operatively ensure respectively the winding and unwinding of the film around the spool, lever means carrying said rollers, a pivot around which said lever means rocks to ensure the selective engagement of the rollers with the take-up spool, a rotary gear carried by said pivot and controlling the two rollers in opposite directions, said feeler pivotally carried by said pivot and urging the operative roller away from the take-up spool whenever said loop shrinks to a predetermined extent.

4. The combination as claimed in claim 3 and further including a stud rigid with said lever means, a stop rigid with said feeler and cooperating with said stud to limit the angular spacing between said feeler and said lever means and a spring connecting the feeler and lever to urge them into a position for which the stud and stop are engaged.

5. The combination as claimed in claim 1 wherein said roller is carried by said feeler.

6. The combination as claimed in claim 1 wherein said intermittent film stopping means includes a bell crank, said feeler mounted at one end of said bell crank and said roller mounted at the opposite end thereof and a spring urging said bell crank into a position whereby the roller engages the take-up spool.

* * * * *